Patented Jan. 31, 1939

2,145,387

UNITED STATES PATENT OFFICE 2,145,387

PROCESS OF HYDROGENATING MONOVINYLACETYLENE

Walter Berndt, Frankfort-on-the-Main-Hochst, and Otto Wulff, Konigstein in Taunus, Germany, assignors to I. G. Farbenindustrie Aktiengesellschaft, Frankfort-on-the-Main, Germany No Drawing. Application November 9, 1937, Serial No. 173,616. In Germany October 22, 1936

3 Claims. (Cl. 260—680)

The present invention relates to a process of hydrogenating monovinylacetylene.

According to our copending application Serial No. 173,615 of even date butadiene can be obtained in a particularly advantageous manner by continuously hydrogenating monovinylacetylene in the presence of water and of a hydrogenation catalyst applied to a shaped carrier substance. The advantage of this method of operating is based among others on the fact that vinylacetylene and butadiene possess a highly different solubility in water and furthermore that the catalyst is continually cooled by the water during the hydrogenation. On the other hand operating in the presence of water or aqueous solvents often causes an aggravation of the hydrogenation owing to the oily by-product which is simultaneously produced (see copending application Serial No. 134,836 filed on April 3, 1937, in the name of Walter Berndt, Otto Wulff and Willi Gaedke).

Now we have found that this drawback can be avoided by suspending the hydrogenation catalyst in the oily constituents formed as by-products during the hydrogenation of monovinylacetylene. These constituents are probably condensation products; they contain more than 4 carbon atoms and have been described in the application above referred to. They likewise possess the property of dissolving vinylacetylene more readily than butadiene.

It has been found that the oil is a mixture of different strongly unsaturated hydrocarbons. Though as a rule the hydrogen used for the hydrogenation is not completely consumed, the oil permanently present in the reaction zone is not completely hydrogenated in the present case. At mild reaction conditions it maintains its desirable strongly unsaturated character.

The use of the oil has the advantage that the hydrogenation can be carried out without addition of any foreign substances. Moreover, this method of operating allows of industrially performing the process in any desired form. There may be operated at room temperature, but also at about 0°. Furthermore a raised temperature, for instance about 40° C., may be applied. As catalysts there may be used the usual hydrogenation catalysts, for instance palladium and nickel or perhaps also cobalt. The catalyst may be used in the shaped condition, for instance in the form of pieces on a carrier in the trickling tower as described in our application of even date or in the form of a suspension in stirring vessels, towers or the like. The new formation of oil during the process causes a gradual increase of the entire quantity of oil, which increase can be overcome by continuously or discontinuously removing the excess of the oil.

The process may be carried out under normal pressure, but a reduced pressure or an increased pressure, for instance about 5 atmospheres may likewise be used.

The following examples serve to illustrate the invention, but they are not intended to limit it thereto:

1. In a trickling tower filled with a catalyst in the form of pieces, for instance palladium on fragments of clay the oil obtained during the hydrogenation of monovinylacetylene (see the application above referred to) is pumped back in such a manner that the grainy catalyst is trickled over as uniformly as possible. By passing a mixture of gas containing 58 per cent. of vinylacetylene through the tower at a temperature of 20° C. to 25° C., a gaseous reaction product is obtained which consists of butadiene and butylene in the proportion of 77:23, besides non-consumed monovinylacetylene and hydrogen. The oil which is likewise produced is continuously eliminated from the circulating process pari passu with the increase of its volume.

2. A quantity of 5 parts by volume of the partially hydrogenated oil formed during the reaction and a small quantity of palladium black are filled into a suitable stirring vessel whose structure allows according to known principles a good mixing of gas, liquid and suspended catalyst. A mixture of vinylacetylene and hydrogen in the proportion of about 3:2 is then caused to pass through the vesel at a temperature of 20°–25° C. A mixture of gas is obtained in which the proportion of butadiene to butylene is about 3:1. By means of a simple overflow the newly formed oil may be drawn off continuously or discontinuously after the contact has been allowed to deposit. By this operation the quantity of liquid is kept constant.

The oil required for causing the apparatus to run may be obtained according to the process described in the example of our application of even date or in the co-pending application above referred to.

We claim:

1. In the process of hydrogenating monovinylacetylene the step which consists in causing hydrogen to act upon monovinylacetylene in the presence of a hydrogenation catalyst and of an additional amount of the oily constituents obtained as by-products during the hydrogenation of monovinylacetylene, said constituents having more than 4 carbon atoms.

2. In the process of hydrogenating monovinylacetylene the step which consists in causing hydrogen to act upon monovinylacetylene in the presence of palladium applied to fragments of clay and of an additional amount of the oily constituents obtained as by-products during the hydrogenation of monovinylacetylene, said constituents having more than 4 carbon atoms.

3. In the process of hydrogenating monovinylacetylene the step which consists in causing hydrogen to act upon monovinylacetylene in the presence of a suspension of palladium black in the oily constituents obtained as by-products during the hydrogenation of monovinylacetylene, said constituents having more than 4 carbon atoms.

WALTER BERNDT.
OTTO WULFF.